US010967572B2

(12) United States Patent
Schwerdtfeger et al.

(10) Patent No.: US 10,967,572 B2
(45) Date of Patent: Apr. 6, 2021

(54) BUILD PLATES INCLUDING CONDUITS FOR ADDITIVE MANUFACTURING SYSTEMS AND METHODS OF BUILDING COMPONENTS ON BUILD PLATES

(71) Applicant: General Electric Company, Schenectady, NY (US)

(72) Inventors: Jan Vladimir Schwerdtfeger, Birr (CH); Adnan Bobar, Suhr (CH); Juan Vicente Haro Gonzalez, Zurich (CH); Danijel Medved, Villmergen (CH)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 606 days.

(21) Appl. No.: 15/490,270

(22) Filed: Apr. 18, 2017

(65) Prior Publication Data

US 2018/0297296 A1    Oct. 18, 2018

(51) Int. Cl.
*B29C 64/245* (2017.01)
*B29C 64/153* (2017.01)
(Continued)

(52) U.S. Cl.
CPC ............ *B29C 64/245* (2017.08); *B22F 12/00* (2021.01); *B28B 1/001* (2013.01); *B29C 64/153* (2017.08); *B29C 64/40* (2017.08); *B33Y 10/00* (2014.12); *B33Y 30/00* (2014.12); *B22F 10/10* (2021.01); *B22F 2005/103* (2013.01); *Y02P 10/25* (2015.11)

(58) Field of Classification Search
CPC .......... B22F 10/00; B22F 10/40; B22F 10/43; B22F 10/47; B22F 12/00; B22F 12/30; B22F 2203/1056; B22F 2203/1058; B22F 2005/103; B22F 3/1055; B28B 1/001; B29C 64/00; B29C 64/153; B29C 64/171; B29C 64/176; B29C 64/182; B29C 64/20; B29C 64/245; B29C 64/40; B33Y 10/00; B33Y 30/00; Y02P 10/295
See application file for complete search history.

(56) References Cited

U.S. PATENT DOCUMENTS 6,644,703 B1 * 11/2003 Levin .................. B25J 15/0616
                                                                 279/3
8,185,229 B2    5/2012 Davidson
(Continued)

OTHER PUBLICATIONS

Merriam Webster: Adjacent. Retrieved online Nov. 20, 2019. https://www.merriam-webster.com/dictionary/adjacent?src=search-dict-hed (Year: 2019).*

*Primary Examiner* — Nahida Sultana
*Assistant Examiner* — Manley L Cummins, IV
(74) *Attorney, Agent, or Firm* — James Pemrick; Hoffman Warnick LLC

(57) ABSTRACT

Build plates for additive manufacturing systems are disclosed. The build plates of the additive manufacturing systems may include a body including a build surface, and a bottom surface positioned opposite the build surface. The build plates may also include a first conduit formed through the body and extending between the build surface and the bottom surface. The first conduit may be configured to be in fluid communication with a first aperture formed through a surface of a first component that may be built on the build surface of the body of the build plates.

2 Claims, 15 Drawing Sheets

(51) Int. Cl.
*B29C 64/40* (2017.01)
*B22F 12/00* (2021.01)
*B33Y 10/00* (2015.01)
*B33Y 30/00* (2015.01)
*B28B 1/00* (2006.01)
B22F 5/10 (2006.01)
B22F 10/10 (2021.01)

(56) References Cited

U.S. PATENT DOCUMENTS

| | | | |
|---|---|---|---|
| 9,633,889 B2 * | 4/2017 | Cuvalci | H01L 21/6875 |
| 2004/0084814 A1 * | 5/2004 | Boyd | B33Y 40/00 |
| | | | 264/497 |
| 2010/0044547 A1 * | 2/2010 | Higashi | B22F 10/00 |
| | | | 249/79 |
| 2015/0056321 A1 | 2/2015 | Zhang et al. | |
| 2015/0258744 A1 | 9/2015 | Muller et al. | |
| 2017/0297320 A1 * | 10/2017 | Swanson | B29C 64/40 |

* cited by examiner

US 10,967,572 B2

BUILD PLATES INCLUDING CONDUITS FOR ADDITIVE MANUFACTURING SYSTEMS AND METHODS OF BUILDING COMPONENTS ON BUILD PLATES

BACKGROUND OF THE INVENTION

The disclosure relates generally to additive manufacturing systems, and more particularly, to build plates including conduits for removing material positioned within channels formed through components built on the build plates and methods of building components on the build plates.

Components or parts for various machines and mechanical systems may be built using additive manufacturing systems. Additive manufacturing systems may build such components by continuously layering powder material in predetermined areas and performing a material transformation process, such as sintering or melting, on the powder material. The material transformation process may alter the physical state of the powder material from a granular composition to a solid material to build the component. The components built using the additive manufacturing systems have nearly identical physical attributes as conventional components typically made by performing machining processes on stock material.

Conventional additive manufacturing systems build components on large, solid build plates. These conventional build plates are often made of two inches (or more) of solid metal, for example stainless steel. While suitable for some components, the solid material forming the conventional build plates may make manufacturing components with unique features difficult. For example, some components manufactured on conventional build plates include channels formed therein. Some of these channels may include one aperture formed on and/or disposed through a surface that may contact, be built directly on and/or be obstructed by the conventional, solid build plate. As a result, the channel of the component that may be obstructed by the solid, conventional build plate may not be capable of being cleared of unsintered material, particles and/or debris before undergoing post-processes, such as polishing, coating and/or heat treatment. The inability to clear the channels formed in the component from unsintered material, particles and/or debris may result in undesirable build effects on the component after performing post-processes. For example, the unsintered material, particles and/or debris that may remain within the channels may become sintered when performing the post-processes on the component, which may result in partial or complete blockage of the channel within the component. Blockage of the channel may adversely affect the intended functionality and/or operation of the component built on the conventional build plate.

In another example, the component including the internal channel may also be built to include an aperture formed through an exposed surface of the component to provide access to the channel. While this may increase access to the internal channel of the component, and in turn improve the ability to clear the channel of unsintered material, particles and/or debris, the number of components that may be built on a single build plate may be reduced. Specifically, to provide adequate access to the aperture formed on the exposed surface of the component, the components built on the build plate need to be separated a distance to allow for a device capable of clearing the channels of unsintered material (e.g., air gun) to access each aperture. As a result, fewer components may be built on the build plate during a single build process. This in turn increases the cost and time for building the components that include internal channels using additive manufacturing.

BRIEF DESCRIPTION OF THE INVENTION

A first aspect of the disclosure provides a build plate of an additive manufacturing system. The build plate includes: a body including: a build surface; and a bottom surface positioned opposite the build surface; and a first conduit formed through the body and extending between the build surface and the bottom surface, the first conduit configured to be in fluid communication with a first aperture formed through a surface of a first component built on the build surface of the body.

A second aspect of the disclosure provides a build plate for an additive manufacturing system. The build plate includes: a build surface; a first outlet opening formed through the build surface; a bottom surface positioned opposite the build surface; a first inlet opening formed through the bottom surface; a first conduit fluidly coupling the first outlet opening and the first inlet opening; and a first component built on the build surface, the first component including: a first aperture formed through a surface contacting the build surface, the first aperture aligned with and in fluid communication with the first outlet opening; and a first channel formed through the first component, the first channel in fluid communication with the first aperture.

A third aspect of the disclosure provides a method including: providing a build plate for an additive manufacturing system, the build plate including a conduit formed through a body of the build plate and extending between a build surface and a bottom surface of the build plate; positioning the build plate on an adjustable build platform; and building a component on the build surface of the build plate, directly over the conduit, the component including: an aperture formed through a surface built directly on the build surface of the build plate; and a channel formed at least partially through the component and in fluid communication with the aperture, the channel substantially aligned with the conduit of the build plate.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As an initial matter, in order to clearly describe the current disclosure it will become necessary to select certain terminology when referring to and describing relevant machine components within the scope of this disclosure. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

The following disclosure relates generally to additive manufacturing systems, and more particularly, to build plates including conduits for removing material positioned within channels formed through components built on the build plates and methods of building components on the build plates.

These and other embodiments are discussed below with reference to FIGS. 1-14. However, those skilled in the art will readily appreciate that the detailed description given herein with respect to these Figures is for explanatory purposes only and should not be construed as limiting.

Figure 1:
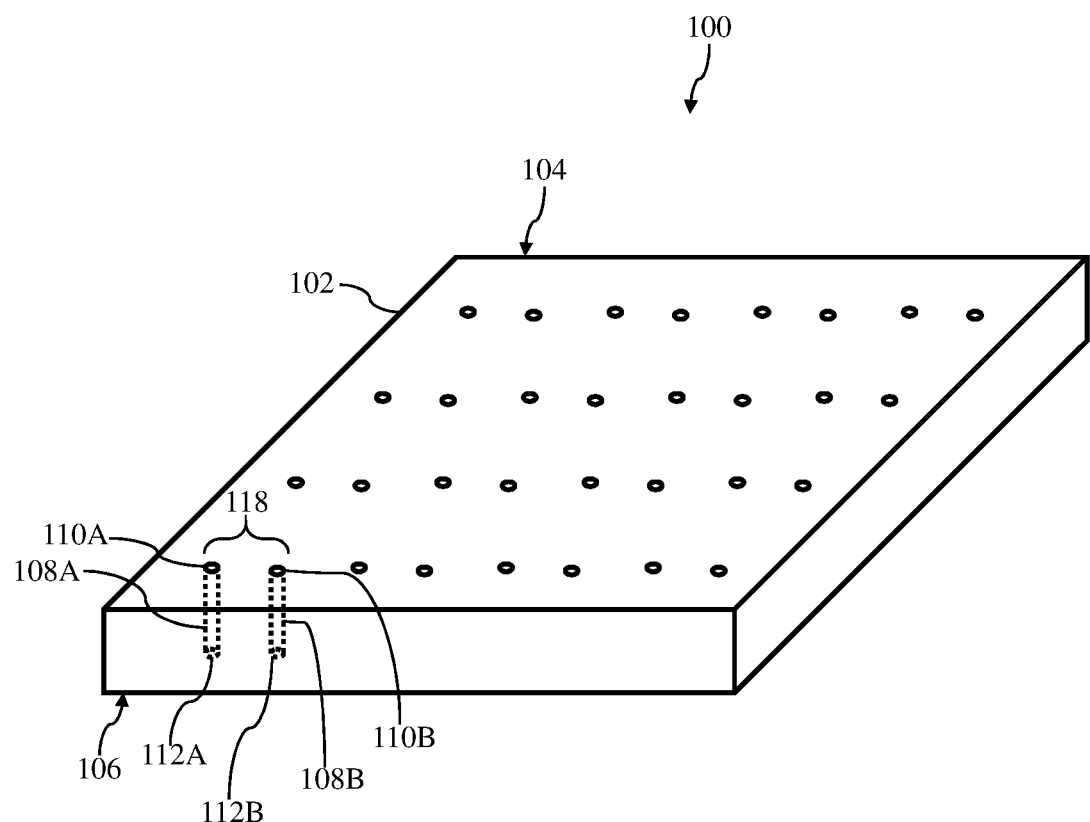
FIG. 1 shows a perspective view of a build plate including a plurality of conduits for an additive manufacturing system, according to embodiments.
Figure 2:
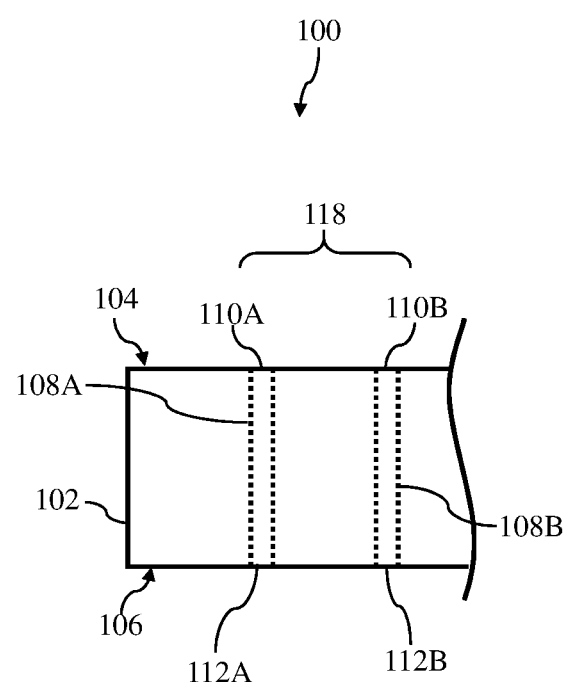
FIG. 2 shows a front view of a portion of the build plate of FIG. 1, according to embodiments.
Figure 15:
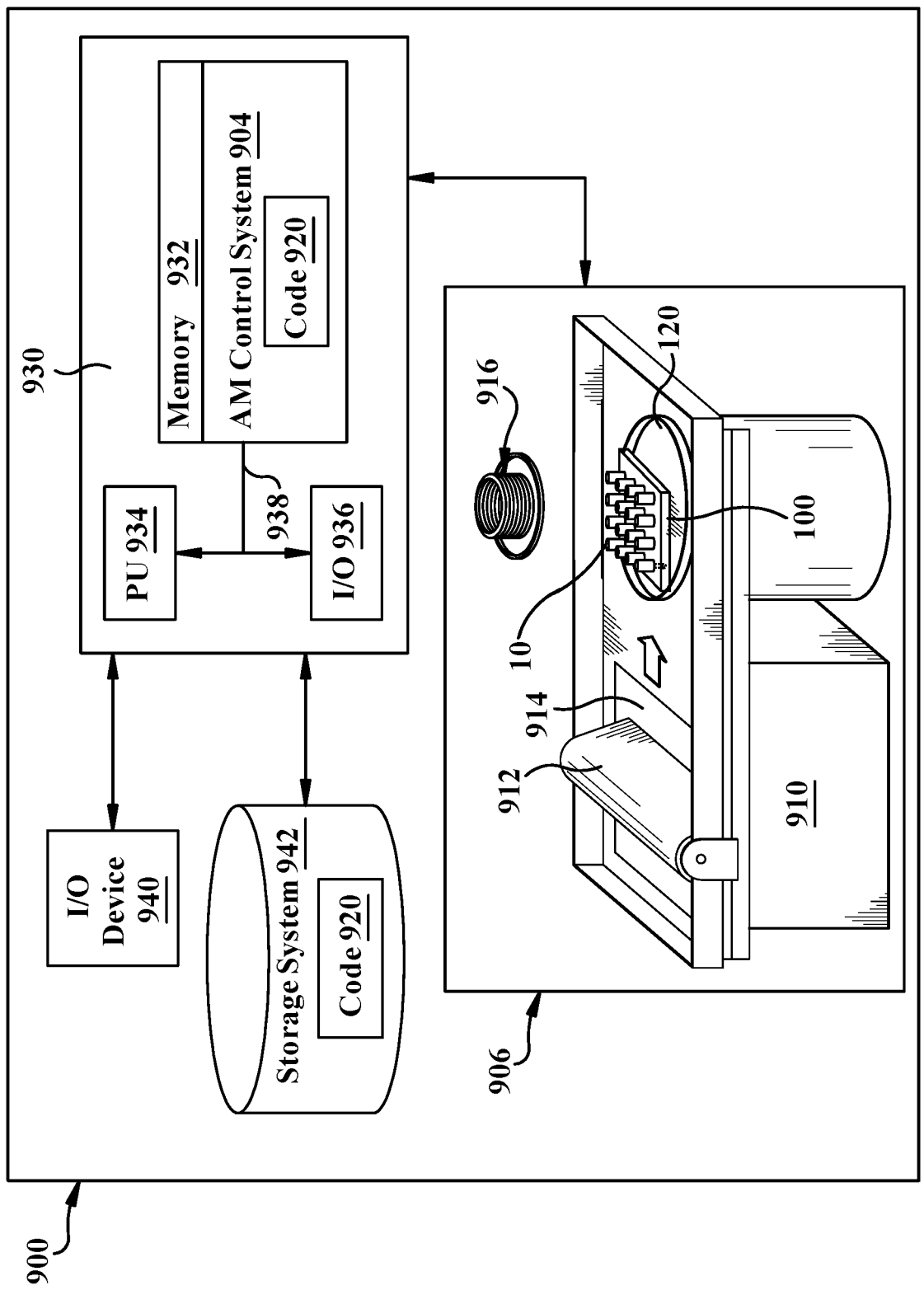
FIG. 15 shows a block diagram of an additive manufacturing process including a non-transitory computer readable storage medium storing code representative of a support according to embodiments of the disclosure.

FIGS. 1 and 2 shows various views of a build plate 100 of an additive manufacturing system (AMS) (see, FIG. 15; AMS 900). Specifically, FIG. 1 shows a perspective view of build plate 100 of AMS, and FIG. 2 shows a front view of a portion of build plate 100 of the AMS. As shown in FIGS. 1 and 2, build plate 100 may include a body 102 including a build surface 104. Build surface 104 of build plate 100 may be substantially exposed when build plate 100 is being utilized by the AMS. During an additive manufacturing process discussed herein, build surface 104 may receive, and/or be built upon by the AMS to form a component (see, FIG. 3). Body 102 of build plate 100 may also include bottom surface 106 positioned opposite build surface 104. When utilized in the AMS, bottom surface 106 may be positioned on and/or may contact a moveable platform (see, FIG. 15), that may be configured to adjust a position of build plate 100 to aid in the building of the component on build surface 104 of build plate 100.

In the non-limiting example shown in FIGS. 1 and 2, build plate 100 may be shaped and/or include a geometry of a quadrilateral, and specifically a rectangle. As a result, build plate 100 may include four distinct sides formed between bottom surface 102 and build surface 104. It is understood that the shape and/or geometry of build plate 100 shown herein is merely illustrative. As such, build plate 100 may include any geometry and/or size that may correspond to and/or may support the building of component 10 by the AMS, as discussed herein. As a result of the non-limiting possibilities for the shape and/or geometry of build plate 100, the number of sides of build plate 100 shown herein may also be merely illustrative, and build plate 100 may include more or less sides than those shown and discussed herein.

As shown in FIGS. 1 and 2, build plate 100 may also include a first conduit 108A (shown in phantom). First conduit 108A may be formed within and/or through build plate 100. Specifically, first conduit 108A may be formed through body 102 of build plate 100 and/or may extend between build surface 104, and bottom surface 106. As a result of forming first conduit 108A through body 102 of build plate 100, first conduit 108A may also form a passageway through build plate 100 and/or between build surface 104 and bottom surface 106 of body 102. As discussed herein, first conduit 108A of build plate 100 may be substantially aligned with and/or in fluid communication with channel(s) of a component (see, FIG. 3) formed, positioned and/or built on build surface 104 of build plate 100. First conduit 108A may provide an open path or passageway to the channel(s) of the component to allow a fluid (e.g., pressurized air, liquid solvent) to flow through the channels and remove any unsintered material or particles that may undesirably remain in the channel(s) after formation of the component on build surface 104 of build plate 100.

Build plate 100 may also include a plurality of openings. For example, and as shown in FIGS. 1 and 2, build plate 100 may include a first outlet opening 110A. First outlet opening 110A may be formed through and/or on build surface 104 of build plate 100. As shown in the non-limiting example, first outlet opening 110A may be fluidly coupled and/or in fluid communication with first conduit 108A formed through body 102 of build plate 100. That is, in the non-limiting example shown in FIGS. 1 and 2, first conduit 108A may include and/or be fluidly coupled to first outlet opening 110A formed through build surface 104 of build plate 100. As discussed herein, first outlet opening 110A of build plate 100 may be substantially aligned with, in fluid communication with and/or contact an aperture for channel(s) of a component (see, FIG. 3) formed, positioned and/or built on build surface 104 of build plate 100. First outlet opening 110A may aid in fluidly coupling first conduit 108A to the channel(s) of the component, as discussed herein.

Additionally, build plate 100 may also include a first inlet opening 112A (shown in phantom). As shown in FIGS. 1 and 2, first inlet opening 112A may be formed on and/or through bottom surface 106 of build plate 100. That is, first inlet opening 112A may be formed through bottom surface 106 of body 102, adjacent build surface 104 and/or first outlet opening 110A. Similar to first outlet opening 110A, first inlet opening 112A may be fluidly coupled and/or in fluid communication with first conduit 108A formed through body 102 of build plate 100. In the non-limiting example shown in FIGS. 1 and 2, first conduit 108A may include and/or be fluidly coupled to first inlet opening 112A formed through bottom surface 106 of build plate 100. As such, first conduit 108A may be substantially disposed between first outlet opening 110A and inlet opening 112A, respectively. Additionally, and as a result of being fluidly coupled to and/or in fluid communication with first outlet opening 110A and first inlet opening 112A, respectively, first conduit 108A may fluidly couple first outlet opening 110A and first inlet opening 112A of build plate 100. In the non-limiting example shown in FIGS. 1 and 2, first inlet opening 112A formed through bottom surface 106 may be at least partially aligned with and/or substantially concentric with first conduit 108A and/or first outlet opening 110A formed through build surface 104 of body 102. In other non-limiting examples, first inlet opening 112A may be substantially offset from at least a portion of first conduit 108A and/or first outlet opening 110A.

Build plate 100 may also include at least one distinct conduit 108B (shown in phantom). In the non-limiting example shown in FIGS. 1 and 2, body 102 of build plate 100 may include a second conduit 108B. Second conduit 108B may be positioned adjacent first conduit 108A. Similar to first conduit 108A, second conduit 108B may be formed within and/or through build plate 100. Specifically, second conduit 108B may be formed through body 102 of build plate 100 and/or may extend between build surface 104, and bottom surface 106, adjacent first conduit 108A. As a result of forming second conduit 108B through body 102 of build plate 100, second conduit 108B may form a distinct passageway through build plate 100 and/or between build surface 104 and bottom surface 106 of body 102. As discussed herein, and similar to first conduit 108A, second conduit 108B may be substantially aligned with and/or in fluid communication with channel(s) of a component (see, FIG. 3) built on build surface 104 of build plate 100 to provide an open path or passageway to the channel(s) and allow a fluid (e.g., pressurized air, liquid solvent) to flow through the channels. Additionally as discussed herein, second conduit 108B may be in fluid communication with a distinct channel formed in the component than first conduit 108A (e.g., see, FIG. 3), or alternatively, may be in fluid communication with the same channel as first conduit 108A (e.g., see, FIG. 9).

As a result of including second conduit 108B, build plate 100 may also include distinct inlet and outlet openings. For example, and as shown in FIGS. 1 and 2, build plate 100 may include a second outlet opening 110B, distinct from first outlet opening 110A. Second outlet opening 110B may be formed through and/or on build surface 104 of build plate 100. As shown in the non-limiting example, second outlet opening 110B may be fluidly coupled and/or in fluid communication with second conduit 108B formed through body 102 of build plate 100. That is, in the non-limiting example shown in FIGS. 1 and 2, second conduit 108B may include and/or be fluidly coupled to second outlet opening 110B formed through build surface 104 of build plate 100. As discussed herein, second outlet opening 110B of build plate 100 may be substantially aligned with, in fluid communication with and/or contact the same aperture for channel(s) of a component (see, FIG. 3) as first outlet opening 110A, or alternatively, may be aligned with, in fluid communication with and/or contact a distinct aperture for channel(s) of the component. Additionally as discussed herein, second outlet opening 110B may aid in fluidly coupling second conduit 108B to the channel(s) of the component, as discussed herein.

Additionally in the non-limiting example shown in FIGS. 1 and 2, build plate 100 may also include a second inlet opening 112B (shown in phantom), distinct from first inlet opening 112A. Second inlet opening 112B may be formed on and/or through bottom surface 106 of build plate 100. That is, second inlet opening 112B may be formed through bottom surface 106 of body 102, adjacent or opposite build surface 104 and/or second outlet opening 110B. In the non-limiting example, and similar to second outlet opening 110B, second inlet opening 112B may be fluidly coupled and/or in fluid communication with second conduit 108B formed through body 102 of build plate 100. Additionally as shown in FIGS. 1 and 2, second conduit 108B may include and/or be fluidly coupled to second inlet opening 112B formed through bottom surface 106 of build plate 100. As such, second conduit 108B may be substantially disposed between second outlet opening 110B and second inlet opening 112B, respectively. Additionally, and as a result of being fluidly coupled to and/or in fluid communication with second outlet opening 110B and second inlet opening 112B, respectively, second conduit 108B may fluidly couple second outlet opening 110B and second inlet opening 112B of build plate 100. Similar to first inlet opening 112A, second inlet opening 112B formed through bottom surface 106 may be at least partially aligned with and/or substantially concentric with second conduit 108B and/or second outlet opening 110B formed through build surface 104 of body 102. In other non-limiting examples, second inlet opening 112B may be substantially offset from at least a portion of second conduit 108B and/or second outlet opening 110B.

As shown in FIGS. 1 and 2, conduits 108A, 108B of build plate 100, and more specifically, conduits 108A, 108B, outlet openings 110A, 110B and inlet openings 112A, 112B, collectively, may be formed in distinct groups 118. For example, first conduit 108A and second conduit 108B collectively may form a single group 118 of conduits for build plate 100. As shown in the non-limiting example in FIG. 1, distinct groups 118 of build plate 100 may be organized and/or aligned in rows and/or columns on body 102. The number of conduits included within each group 118 of conduits on build plate 100 may be dependent, at least in part, on the number of apertures and/or channel(s) formed in the component and/or the size of the component. Additionally, the number groups 118 of conduits 108A, 108B included in build plate 100 may be dependent, at least in part, on the size and/or the number of components that may be built on build plate 100, as discussed herein. Furthermore, the pattern, arrangement and/or grouping of the distinct groups 118 of conduits 108A, 108B for build plate 100 may be dependent, at least in part, on the number of apertures and/or channel(s) formed in the component, the size of the component, and/or the number of the component built on build plate 100.

As shown in the non-limiting example in FIGS. 1 and 2, build plate 100 may be formed as a solid, unibody component. That is, build plate 100 may be formed as a single plate. In another non-limiting example, build plate 100 may be formed a plurality of sections that may be joined and/or positioned adjacent one another when positioned within the AMS, as discussed herein. Additionally, build plate 100 may be formed from any suitable material used in additive manufacturing that may also undergo processes for forming conduits 108 through body 102 of build plate 100, as discussed herein. That is, build plate 100 may be formed from any suitable material that may have physical and/or material characteristics that may allow conduits 108A, 108B to be formed through body 102, and subsequently allow the AMS to build the component (see, FIG. 3) on build surface 104 of build plate 100. In non-limiting examples, build plate 100 may be formed from metal or metal alloys.

Additionally, conduits 108A, 108B of built plate 100 may be formed through body 102 using any suitable manufacturing processes or techniques. More specifically, conduits 108A, 108B may be formed through body 102, outlet openings 110A, 110B may be formed through and/or on build surface 104, and/or inlet openings 112A, 112B may be formed through and/or bottom surface 106, respectively, by performing any suitable manufacturing processes and/or techniques on body 102 of build plate 100. In non-limiting examples, build plate 100 may undergo material removal processes or techniques, for example, drilling, milling, grinding, boring, and/or cutting, to form conduits 108A, 108B, outlet openings 110A, 110B and inlet openings 112A, 112B in build plate 100. In another non-limiting example, built plate 100 may be built, manufactured and/or created using the AMS (see, FIG. 15) to include conduits 108A, 108B, outlet openings 110A, 110B and inlet openings 112A, 112B.

Figure 3:
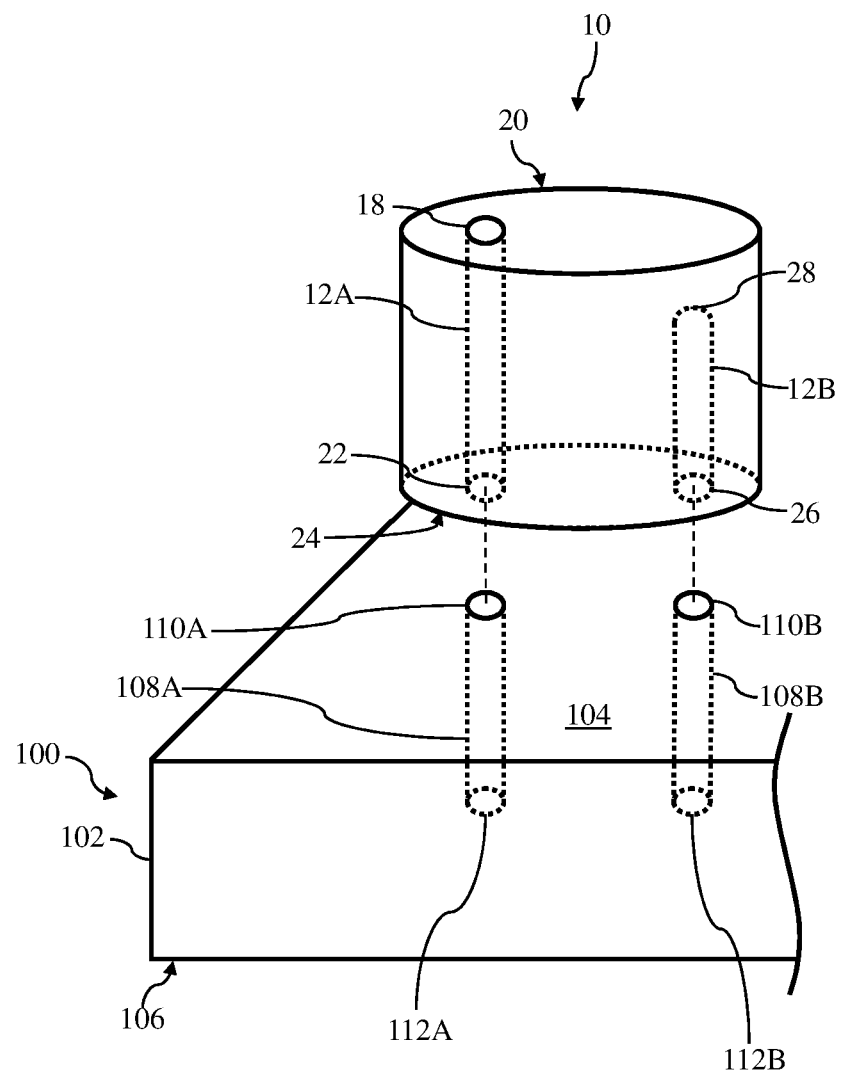
FIG. 3 shows an exploded perspective view of the build plate of FIG. 1 and a component built on the build plate, according to embodiments.

The number of conduits 108A, 108B, outlet openings 110A, 110B and/or inlet openings 112A, 112B formed in build plate 100 may be dependent on a variety of characteristics of build plate 100 and/or the component 10 (see, FIG. 3). For example, and as shown in FIGS. 1 and 2, the number of outlet opening 110A, 110B and inlet opening 112A, 112B may be dependent, at least in part, on the number of conduits 108A, 108B. Additionally, or alternatively, the number of conduits 108A, 108B, outlet openings 110A, 110B and/or inlet openings 112A, 112B may be dependent, at least in part, on the number of aperture(s) and/or channel(s) formed in the component 10, as discussed herein. In other non-limiting examples, build plate 100 may include more or less conduits 108A, 108B, outlet openings 110A, 110B and/or inlet openings 112A, 112B than the number of aperture(s) and/or channel(s) formed in the component. It is understood that the number of conduits 108A, 108B, outlet openings 110A, 110B and/or inlet openings 112A, 112B of build plate 100 shown herein may be merely illustrative. As such, build plate 100 may include more or less conduits 108A, 108B, outlet openings 110A, 110B and/or inlet openings 112A, 112B than those shown and discussed herein.

FIG. 3 shows an exploded perspective view of build plate 100 of FIGS. 1 and 2, and a component 10 built on build plate 100. Specifically, component 10 may be built directly on build surface 104 of build plate 100 by the AMS (see, FIG. 15). It is understood that similarly numbered and/or named components may function in a substantially similar fashion. Redundant explanation of these components has been omitted for clarity.

Component 10 may be formed by undergoing additive manufacturing process(es) using the AMS, as discussed herein. That is, component 10 may be built on build plate 100, and may include various features (e.g., channels) by utilizing the AMS to perform additive manufacturing process(es). As such, component 10 may be formed from any suitable material that may undergo the additive manufacturing process(es) performed by the AMS. In non-limiting examples, component 10 may be formed from thermoplastics, metals, metal-alloys, ceramics, glass and other suitable material.

In the non-limiting example shown in FIG. 3, component 10 may include at least one channel 12A, 12B. In the non-limiting example, component 10 is shown to include a first channel 12A and a second channel 12B. Channels 12A, 12B may be formed, at least partially, through component 10 and may include at least one aperture formed through a surface of component 10. For example, and as shown in FIG. 3, first channel 12A may include and/or may be formed by aperture 18 formed through a top surface 20 of component 10, and aperture 22 formed through a bottom surface 24 of component 10, positioned adjacent and/or below top surface 20. As discussed herein, bottom surface 24 of component 10 may contact and/or be built directly on build surface 104 of build plate 100 when forming or building component 10. First channel 12A of component 10 may fluidly couple aperture 18 with aperture 22. Additionally in the non-limiting example, first channel 12A may also form a passageway through component 10 and/or between top surface 20 and bottom surface 24 of component 10.

Additionally in the non-limiting example shown in FIG. 3, second channel 12B of component 10 may formed adjacent first channel 12A. Second channel 12B may include and/or may be formed from aperture 26 formed through bottom surface 24 of component 10. Distinct from first channel 12A, second channel 12B may not extend completely through and/or may not form a passageway through component 10. Rather, second channel 12B may terminate, stop, and/or end within a portion of component 10. As a result, and as shown in FIG. 3, second channel 12B may include an end 28 positioned within component 10, below top surface 20 and/or opposite aperture 26 formed through bottom surface 24 of component 10.

It is understood that the shape and/or geometry of channels 12A, 12B of component 10 shown herein is merely illustrative. As such, channels 12A, 12B may include any geometry and/or size that may correspond to an intended function, use, and/or operation for component 10. Additionally, the number of channels 12A, 12B of component 10 shown herein may also be merely illustrative, and component 10 may include more or less channels 12A, 12B than those shown and discussed herein. Furthermore, and as discussed herein (e.g., see, FIG. 8) channels 12A, 12B of component 10 may be formed through, and/or may include at least one aperture formed through and/or on any surface of component 10. Although shown as being distinct, separate channels 12A, 12B, it is understood that channels 12A, 12B of component 10 may also be in fluid communication with one another.

As shown in FIG. 3, channels 12A, 12B of component 10 may be substantially aligned with conduits 108A, 108B of build plate 100. More specifically, each channel 12A, 12B of component 10 may be substantially aligned with, fluidly coupled and/or in fluid communication with a corresponding conduit 108A, 108B formed through body 102 of build plate 100. In the non-limiting example shown in FIG. 3, first channel 12A of component 10 may be fluidly coupled and/or in fluid communication with first conduit 108A of build plate 100, and second channel 12B of component 10 may be fluidly coupled and/or in fluid communication with second conduit 108B of build plate 100. In addition to being in fluid communication with channels 12A, 12B of component 10, conduits 108A, 108B of build plate 100 may also be in fluid communication with apertures 22, 26 formed through bottom surface 24 of component 10 as well. That is, first conduit 108A of build plate 100 may be fluidly coupled and/or in fluid communication with aperture 22 formed through bottom surface 24 of component 10, and second conduit 108B of build plate 100 may be fluidly coupled and/or in fluid communication with aperture 26 formed through bottom surface 24 of component 10, respectively.

Additionally, and as shown in FIG. 3, the openings of build plate 100 and the apertures and/or channels of component 10 may be fluidly coupled and/or in fluid communication with one another. For example, first outlet opening 110A formed through build surface 104 of build plate 100 may be substantially aligned, fluidly coupled and/or in fluid communication with aperture 22 formed through bottom surface 24. First outlet opening 110A of build plate 100 may also be substantially aligned, fluidly coupled and/or in fluid communication with first channel 12A of component 10. Additionally as shown in FIG. 3, second outlet opening 110B formed through build surface 104 of build plate 100 may be substantially aligned, fluidly coupled and/or in fluid communication with aperture 26 formed through bottom surface 24. Second outlet opening 110B of build plate 100 may also be substantially aligned, fluidly coupled and/or in fluid communication with second channel 12B of component 10.

As a result of the fluid coupling and/or fluid communication between the conduits 108A, 108B of build plate 100 and channels 12A, 12B of component 10, build plate 100, and specifically conduits 108A, 108B, outlet openings 110A, 110B, and/or inlet openings 112A, 112B, may provide an open path or passageway to the channels 12A, 12B of component 10. That is, the formation of conduits 108A, 108B, outlet openings 110A, 110B, and/or inlet openings 112A, 112B in build plate 100 may form the passageway between and/or may allow conduits 108A, 108B to be fluidly coupled with channels 12A, 12B of component 10. As shown in FIG. 3, build plate 100 including conduits 108A, 108B, outlet openings 110A, 110B, and inlet openings 112A, 112B may not block, obstruct and/or may provide fluid access to apertures 22, 26, and in turn channels 12A, 12B of component 10. Additionally, build plate 100 including conduits 108A, 108B, outlet openings 110A, 110B, and inlet openings 112A, 112B may allow a fluid to flow through channels 12A, 12B to remove any unsintered material and/or particles that may undesirably remain in channels 12A, 12B after the formation of component 10 on build surface 104 of build plate 100. The fluid applied to build plate 100 and component 10, respectively, may be any suitable fluid that may be configured and/or capable of removing unsintered material and/or particles from component 10. For example, the fluid applied to build plate 100 and component 10 may include compressed air, water, or a material solvent. Additionally, the fluid may be applied to build plate 100 and component 10 using any suitable component, system and/or technique.

In a non-limiting example, the fluid utilized to remove unsintered material and/or particles from first channel 12A of component 10 may flow through build plate 100 and component 10, respectively, in the following sequential order: first inlet opening 112A, first conduit 108A, first outlet opening 110A, aperture 22, first channel 12A, and aperture 18. In another non-limiting example, the fluid utilized to remove unsintered material and/or particles from first channel 12A of component 10 may flow through build plate 100 and component 10, respectively, in the following sequential order: aperture 18, first channel 12A, aperture 22, first outlet opening 110A, first conduit 108A, and first inlet opening 112A.

With respect to second channel 12B, the fluid utilized to remove unsintered material and/or particles from second channel 12B may flow, for example, through build plate 100 and component 10, respectively, in the following sequential order: second inlet opening 112B, second conduit 108B, second outlet opening 110B, aperture 26, second channel 12B, end 28, second channel 12B, aperture 26, second outlet opening 110B, second conduit 108B, and second inlet opening 112B. That is, where second channel 12B is formed only through partially through component 10, the fluid provided to component 10 via second conduit 108B of build plate 100 may initially flow through build plate 100 toward component 10 and may subsequently flow out of build plate 100 from component 10. It is understood that all channels 12A, 12B of component 10 may be exposed to the fluid at one time and/or simultaneously. Alternatively, only a portion (e.g., one channel) of channels 12A, 12B may be exposed to the fluid at a time to remove any unsintered material and/or particles that may undesirably remain in channels 12A, 12B after the formation of component 10, as discussed herein.

Figure 4:
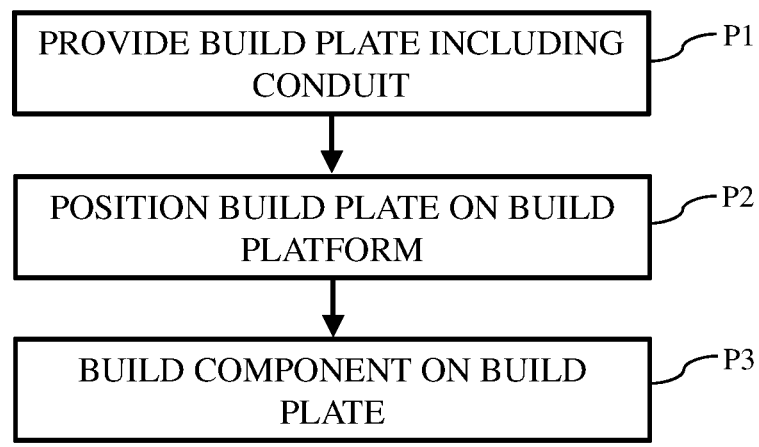
FIG. 4 shows a flow chart of an example process of forming a component on a build plate for an additive manufacturing system, according to embodiments.

FIG. 4 shows an example process for forming or building a component using an additive manufacturing system (hereafter, "AMS"). Specifically, FIG. 4 is a flowchart depicting one example process for forming a component on a build plate including conduits formed therethrough. In some cases, the process may be used to form component 10 on build plate 100, as discussed herein with respect to FIGS. 1-3 and 5-14.

In process P1, a build plate may be provided. More specifically, a build plate utilized by an additive manufacturing system for forming and/or building a component may be provided. The provided build plate in process P1 may include a conduit. The conduit of the build plate may be formed through a body of the build plate and/or may extend between a build surface and a bottom surface of the body and/or the build plate. Providing the build plate may also include forming an outlet opening through the build surface of the build plate and forming an inlet opening through the bottom surface of the build plate. The inlet opening may be fluidly coupled and/or in fluid communication with the outlet via the conduit of the build plate. That is, the conduit of the build plate may be disposed and/or formed between, and may fluidly couple the inlet opening with the outlet opening.

In process P2, the provided build plate may be positioned on an adjustable build platform. That is, the provided build plate may be positioned on an adjustable build platform of the additive manufacturing system. The build plate may be positioned on the adjustable build platform such that the bottom surface of the build plate contacts and/or is positioned directly on the adjustable build platform. Additionally, the build plate may be positioned on the adjustable build platform so the build surface of the build plate may be substantially exposed. The adjustable build platform may be configured to move, adjust and/or change the position of the build plate during the building process to aid in the formation of a component on the build surface of the build plate.

In process P3, a component may be built on the build plate. Specifically, a component may be built on the build surface of the build plate using the additive manufacturing system. The component may be built on the build surface and directly over the conduit of the build plate. The component built on the build surface of the build plate may be built to include an aperture formed through a surface built directly on the build surface of the build plate, and a channel formed at least partially through the component and in fluid communication with the aperture of the component. Additionally, the channel of the component may be substantially aligned with the conduit of the build plate. Building the component in process P3 may also include fluidly coupling the channel of the component with the conduit formed in the build plate. Additionally, building the component on the build surface of the build plate may also include aligning the aperture of the component with the outlet opening formed through the build surface of the build plate, and fluidly coupling the outlet opening of the component with the conduit formed in the build plate.

The processes for forming the component on the build plate may include additional steps and/or processes as well. For example, providing the build plate in process P1 may include forming multiple conduits, outlet openings and/or inlet openings through and/or on the build plate. Additionally, building the component on the build plate in process P3 may include building a plurality of components on the build surface of the build plate. Each of the plurality of components built on the build plate may be built on the build surface, directly over corresponding conduit(s) formed through the build plate. In other non-limiting examples, the processes for forming the component may also include removing the built component from the build surface of the build plate, and (re)exposing the conduit and the build surface of the build plate. Once the component is removed, the build plate may be reused to form additional components directly on the build surface of the build plate.

Figure 5:
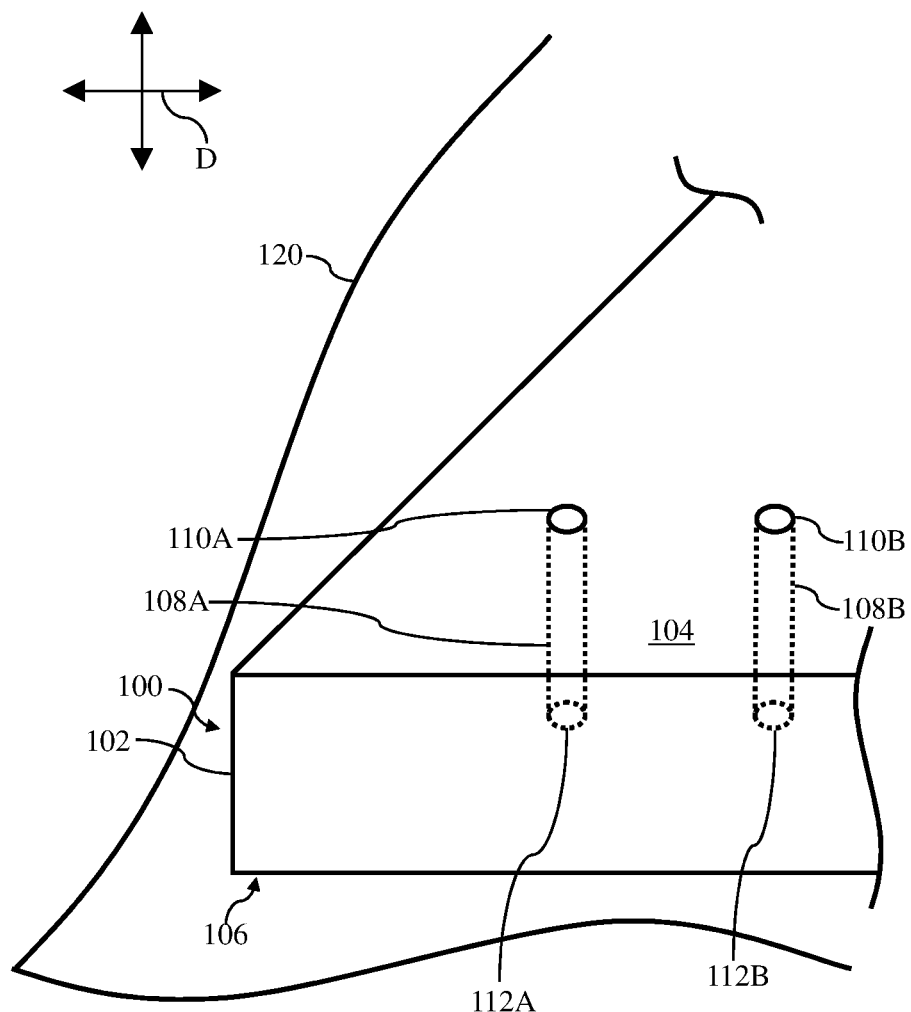
FIGS. 5-7 show perspective views of a component being built on a build plate of an additive manufacturing system by performing the processes of FIG. 4, according to embodiments.
Figure 6:
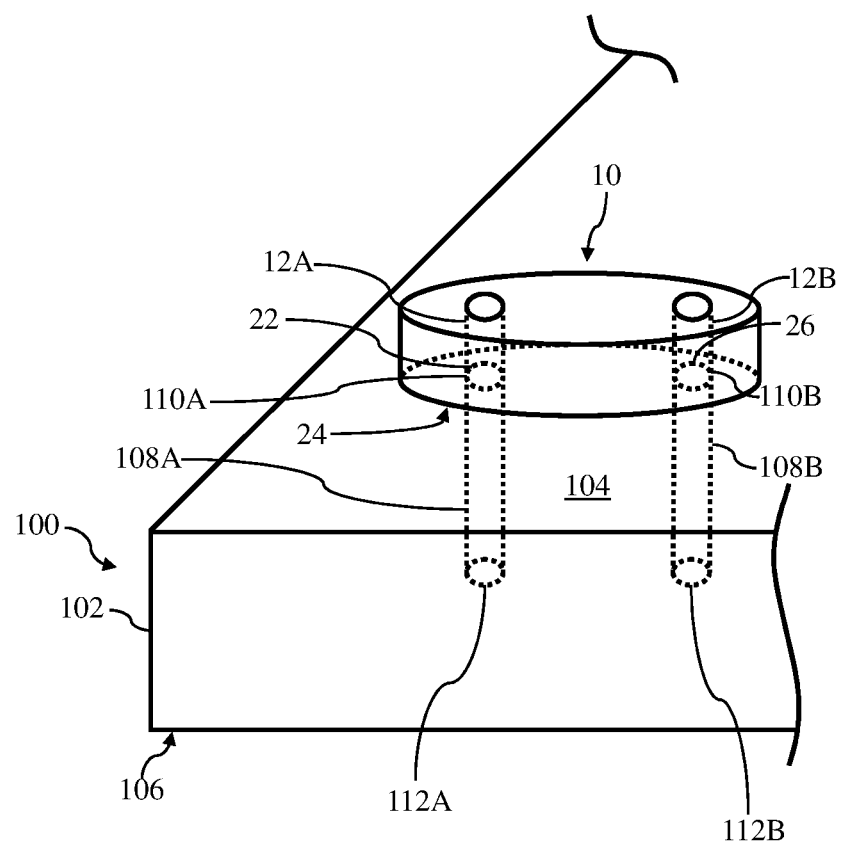
Figure 7:
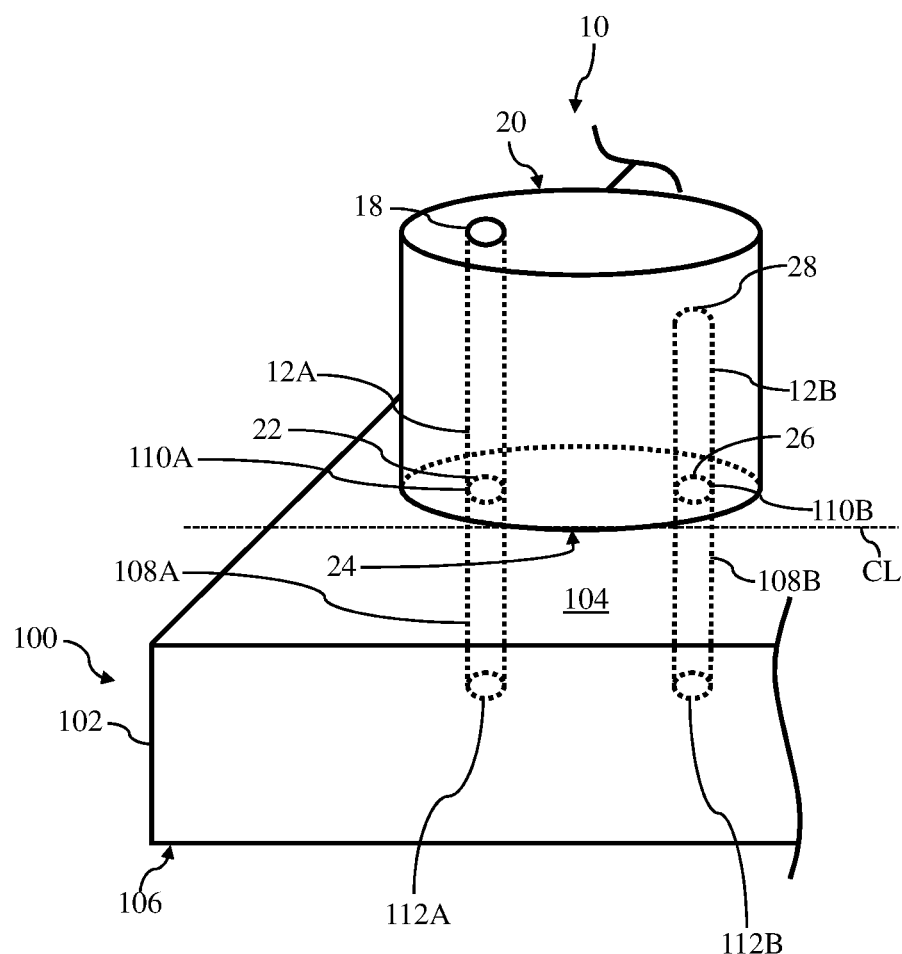

FIGS. 5-7 show build plate 100 and component 10 undergoing the processes discussed herein with respect to the flow chart shown in FIG. 4. For example, FIG. 5 shows a perspective of a portion of provided build plate 100, as discussed herein with respect to process P1 of FIG. 4. As discussed herein with respect to process P1 of FIG. 4, and similar to build plate 100 discussed herein with respect to FIGS. 1-3, provided build plate 100 in FIG. 5 may include conduits 108A, 108B. Conduits 108A, 108B may be formed through body 102 of build plate 100. Additionally, and as discussed herein, conduits 108A, 108B may extend between build surface 104 and bottom surface 106 of body 102 and/or build plate 100. Provided build plate 100 shown in FIG. 5 may also include outlet openings 110A, 110B formed through build surface 104 of build plate 100 and inlet openings 112A, 112B formed through bottom surface 106 of build plate 100. Inlet openings 112A, 112B may be fluidly coupled to and/or in fluid communication with correspond outlet openings 110A, 110B via conduits 108A, 108B.

Additionally as shown in FIG. 5, build plate 100 may be positioned on an adjustable build platform 120 of the AMS (see, FIG. 15) utilized to build component 10, as discussed herein. That is, and similar to process P2 of FIG. 4, provided build plate 100 including conduits 108A, 108B may be positioned on, may contact and/or be seated within adjustable build platform 120. Additionally, provided build plate 100 may be positioned on adjustable build platform 120 such that bottom surface 106 of build plate 100 contacts and/or is positioned directly on adjustable build platform 102. Provided build plate 100 may also be positioned the adjustable build platform 120 so build surface 104 of build plate 100 may be substantially exposed. Although only a portion of adjustable build platform 120 is shown in FIGS. 5-7, it is understood that adjustable build platform 120 may be sized to accommodate and/or may be at least as big as build plate 100. Adjustable build platform 120 may be configured to move, adjust and/or change the position of build plate 100 in various directions (D) during the building process to aid in the formation of component 10 on build surface 104 of build plate 100.

FIGS. 6 and 7 depict component 10 being built on build plate 100. Specifically as discussed herein with respect to process P3 of FIG. 4, FIGS. 6 and 7 show component 10 being built directly on build surface 104 of build plate 100 using the additive manufacturing system (see, FIG. 15) and performing additive manufacturing processes, as discussed herein. FIG. 6 shows component 10 partially built and/or having undergone only a portion of the build process of P3, and FIG. 7 shows finished, built and/or final component 10 built directly on build surface 104 of build plate 100 according to process P3. Adjustable build platform 120 may be omitted from FIGS. 6 and 7 for clarity. However, it is understood that build plate 100 may remain on adjustable build platform 120 during the building of component 10 under process P3.

As discussed herein with respect to process P3 of FIG. 4, and as shown and discussed herein with respect to component 10 of FIG. 3, component 10 built on build surface 104 of build plate 100 may be built directly over build surface 104 and/or directly over conduits 108A, 108B included within build plate 100. As shown in the non-limiting example, and as discussed herein, component 10 may include apertures 22, 26 formed through bottom surface 24 built directly on build surface 104 of build plate 100, and channels 12A, 12B formed at least partially through component 10. Each channel 12A, 12B of component 10 may be fluidly coupled and/or in fluid communication with a corresponding aperture 22, 26 of component 10. Additionally when performing process P3 and building component 10, channels 12A, 12B may be substantially aligned with corresponding conduits 108A, 108B included within provided build plate 100.

As discussed herein, the building process (e.g., process P3) for component 10 may include additional processes. For example, when performing process P3 and building component 10, channels 12A, 12B of component 10 may be fluidly coupled and/or in fluid communication with corresponding conduits 108A, 108B formed in provided build plate 100. Additionally, when performing process P3, building component 10 may include aligning apertures 22, 26 of component 10 with corresponding outlet openings 110A, 110B formed through build surface 104 of build plate 100, and fluidly coupling outlet openings 110A, 110B formed through build surface 104 of build plate 100 with a corresponding channel 12A, 12B of component 10.

FIG. 7 may also show a cut line (CL) positioned at an interface between bottom surface 24 of component 10 and build surface 104 of build plate 100. Cut line (CL) may indicate where component 100 may be cut and subsequently removed from build plate 100 after the AMS builds component 10 on build plate 100. One cut along cut line (CL) and removed from build plate 100, component 10 may undergo finishing processes including, but not limited to, minor machining, sealing, polishing, assembly to another part, etc. Additionally, once component 10 is removed from build plate 100, build surface 104 may be substantially planar, and build surface 104, and/or conduits 108A, 108B may be substantially exposed. Built plate 100, including conduits 108A, 108B, may then be utilized again to form another, distinct component 10 thereon by repeating performance of process P3, as discussed herein.

FIGS. 8-13 shows additional, non-limiting examples of build plate 100 utilized by the AMS (see, FIG. 15) for building component 10. Specifically, FIGS. 8-13 show various, non-limiting examples of build plate 100 and build component 10 including distinct structures, features, geometries, and/or interrelations between features or components. It is understood that similarly numbered and/or named components may function in a substantially similar fashion. Redundant explanation of these components has been omitted for clarity.

Figure 8:
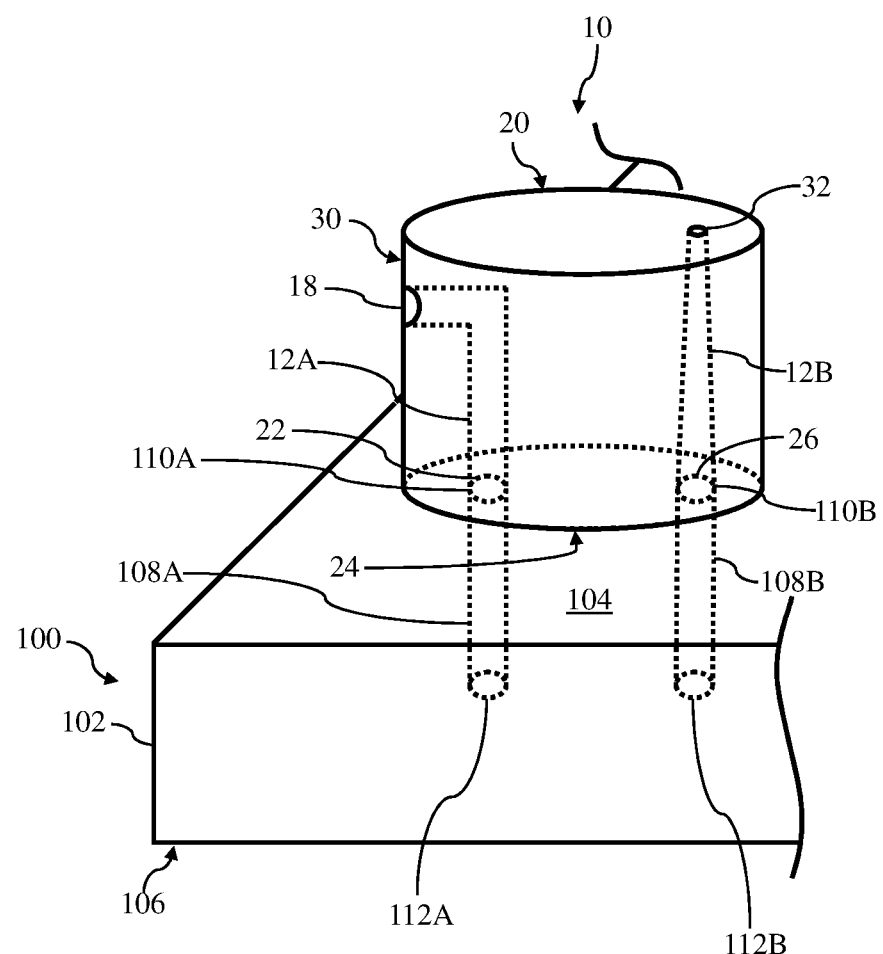
FIG. 8 shows a perspective view of the build plate of FIG. 1 and a component built on the build plate, according to additional embodiments.

In the non-limiting example shown in FIG. 8, channels 12A, 12B of component 10 may include distinct features, shapes and/or geometries as component 10 shown and discussed herein with respect to FIG. 3. For example, as shown in FIG. 8, first channel 12A may be formed completely through component 10, and may include aperture 18 formed through a side surface 30 of component 10. Side surface 30 may be formed between top surface 20, and bottom surface 24 including aperture 22. Additionally as shown in the non-limiting example shown in FIG. 8, second channel 12B may include a substantially tapered geometry. Second channel 12B may include aperture 26 formed in bottom surface 24 of component 10 similar to that shown and discussed herein with respect to FIG. 3. However, distinct from FIG. 3, second channel 12B may be formed completely through component 10. As such, second channel 12B may include aperture 32 formed through top surface 20 of component 10. Aperture 32 of component 10 may be fluidly coupled to and/or in fluid communication with aperture 26 via second channel 12B. Because of the tapered geometry of second channel 12B, aperture 32 in the non-limiting example shown in FIG. 8 may be substantially smaller in size, shape and/or diameter than aperture 26 formed opposite aperture 32.

Figure 9:
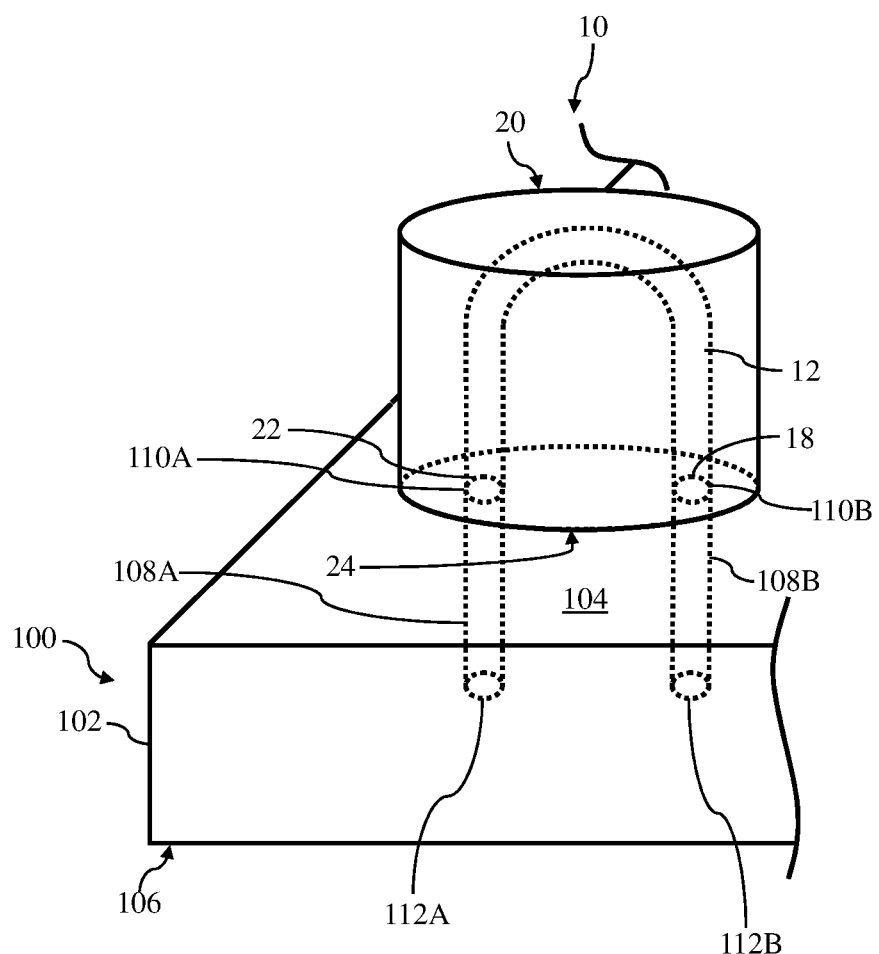
FIG. 9 shows a perspective view of the build plate of FIG. 1 and a component built on the build plate, according to other embodiments.
Figure 10:
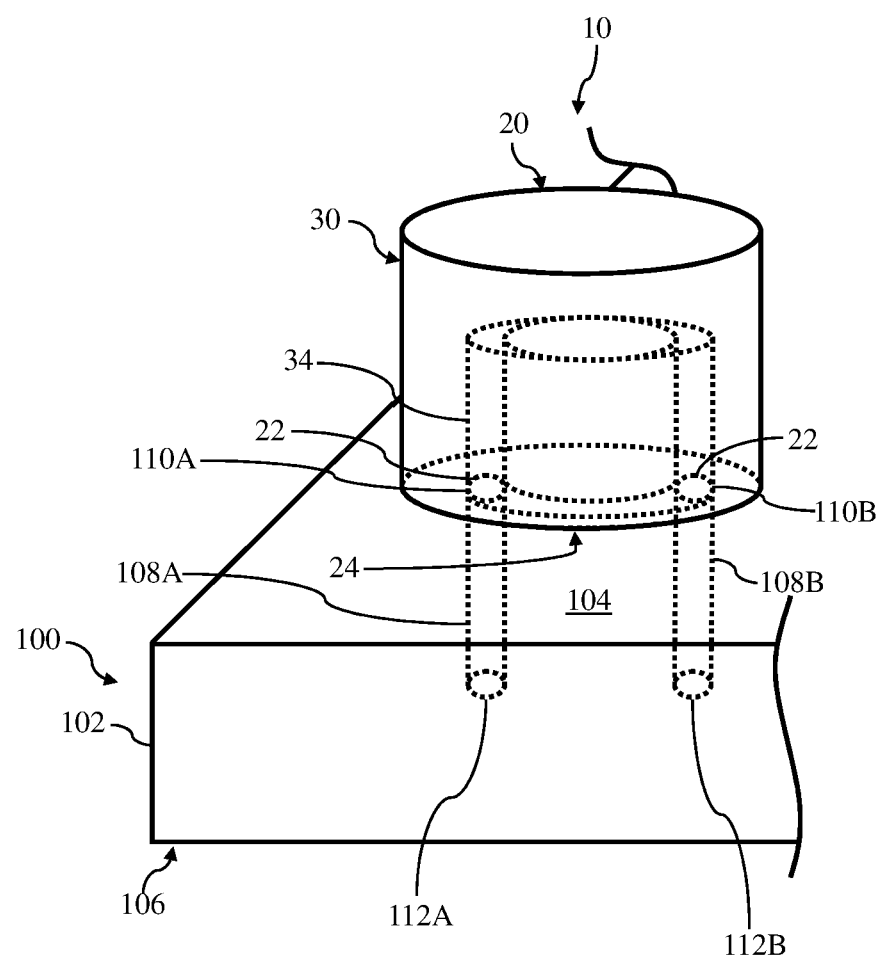
FIG. 10 shows a perspective view of the build plate of FIG. 1 and a component built on the build plate, according to another embodiment.

In the non-limiting example shown in FIG. 9, component 10 may include a single channel 12 formed therethrough. That is, and as shown in FIG. 9, single channel 12 of component 10 may extend at least partially through component 10. Single channel 12 may include, be formed by and/or may extend between aperture 22 formed through bottom surface 24, and aperture 18 formed through bottom surface 24, adjacent aperture 22. As shown in FIG. 9, first conduit 108A and second conduit 108B of build plate 100 may be fluidly coupled and/or in fluid communication with single channel 12 of component 10. Specifically, first outlet opening 110A of build plate 100 may be aligned and/or fluidly coupled with aperture 22 of component 10, and second outlet opening 110B may be aligned and/or fluidly coupled with aperture 18 to fluidly couple first conduit 108A and second conduit 108B to single channel 12 of component 10.

In a first non-limiting example, the fluid utilized to remove unsintered material and/or particles from single channel 12 of component 10 may flow through build plate 100 and component 10, respectively, in the following sequential order: first inlet opening 112A, first conduit 108A, first outlet opening 110A, aperture 22, single channel 12, aperture 18, second outlet opening 110B, second conduit 108B, and second inlet opening 112B. In another non-limiting example, the fluid utilized to remove unsintered material and/or particles from first channel 12A of component 10 may flow through build plate 100 and component 10, respectively, in a sequential order opposite to the first non-limiting example (e.g., second inlet opening 112B, second conduit 108B, second outlet opening 110B, aperture 18, single channel 12, and so on).

In another non-limiting example, component 10 may include an annular space or channel 34 (hereafter, "annular channel 34") formed at least partially within and substantially around component 10. In the non-limiting example shown in FIG. 10, component 10 may include annular channel 34 formed in and/or on bottom surface 24. Annular channel 34 may extend partially through component 10, toward top surface 20. Additionally, because of the shape and/or geometry of annular channel 34, annular channel 34 may include a single aperture 22 that may extend through, on and/or around bottom surface 24. Similar to FIG. 9, first conduit 108A and second conduit 108B of build plate 100 may both be fluidly coupled and/or in fluid communication with annular channel 34 of component 10. Specifically, first outlet opening 110A and second outlet opening 110B of build plate 100 may both be aligned and/or fluidly coupled with aperture 22 of component 10 to fluidly couple first conduit 108A and second conduit 108B to annular channel 34 of component 10.

When provided to component 10 to remove unsintered material and/or particles from annular channel 34, the fluid may move annularly around annular channel 34 of component 10, and/or flow annularly through annular channel 34 of component 10. In a first non-limiting example, the fluid utilized to remove unsintered material and/or particles from annular channel 34 of component 10 may flow through build plate 100 and component 10, respectively, in the following sequential order: first inlet opening 112A, first conduit 108A, first outlet opening 110A, aperture 22, annular channel 34, aperture 22, second outlet opening 110B, second conduit 108B, and second inlet opening 112B. In another non-limiting example, the fluid utilized to remove unsintered material and/or particles from annular channel 34 of component 10 may flow through build plate 100 and component 10, respectively, in a sequential order opposite to the first non-limiting example (e.g., second inlet opening 112B, second conduit 108B, second outlet opening 110B, aperture 22, annular channel 34, aperture 22, and so on).

Figure 11:
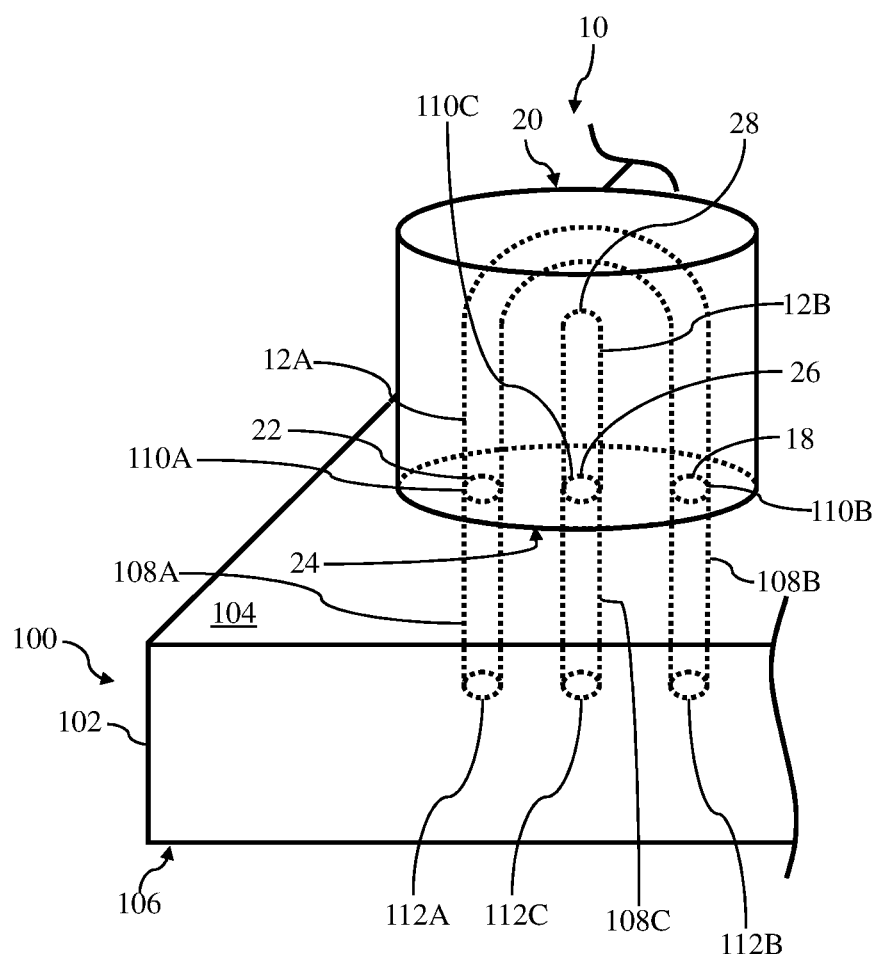
FIG. 11 shows a perspective view of the build plate of FIG. 1 and a component built on the build plate, according to further embodiments.

FIG. 11 shows a non-limiting example where component 10 includes two distinct channels 12A, 12B, but at least three distinct apertures 22, 18, 26 formed through bottom surface 24. As a result, build plate 100 may include three distinct conduits 108A, 108B, 108C for providing fluid to the various channels 12A, 12B of component 10 to remove unsintered material and/or particles from component 10, as discussed herein. In the non-limiting example, first channel 12A may be substantially similar, structurally and functionally, to single channel 12 shown and discussed herein with respect to FIG. 9. As such, first conduit 108A and second conduit 108B of build plate 100 may be substantially similar, structurally and functionally, to first conduit 108A and second conduit 108B of build plate 100 also shown and discussed in FIG. 9. Additionally in the non-limiting example, second channel 12B may be substantially similar, structurally and functionally, to second channel 12B shown and discussed herein with respect to FIGS. 3 and 7, and third conduit 108C of build plate 100 may be substantially similar, structurally and functionally, to second conduit 108B of build plate 100 shown and discussed herein with respect to FIGS. 3 and 7. Redundant explanation of these components has been omitted for clarity.

Figure 12:
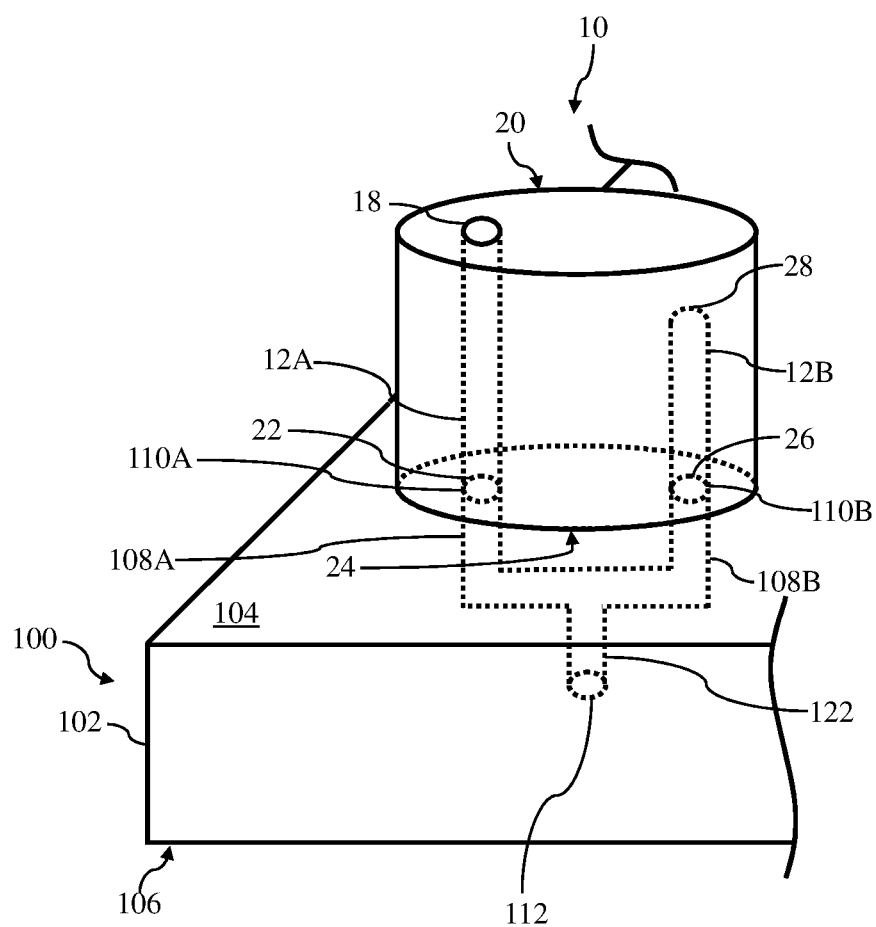
FIG. 12 shows a perspective view of the build plate of FIG. 1 and a component built on the build plate, according to additional embodiments.
Figure 13:
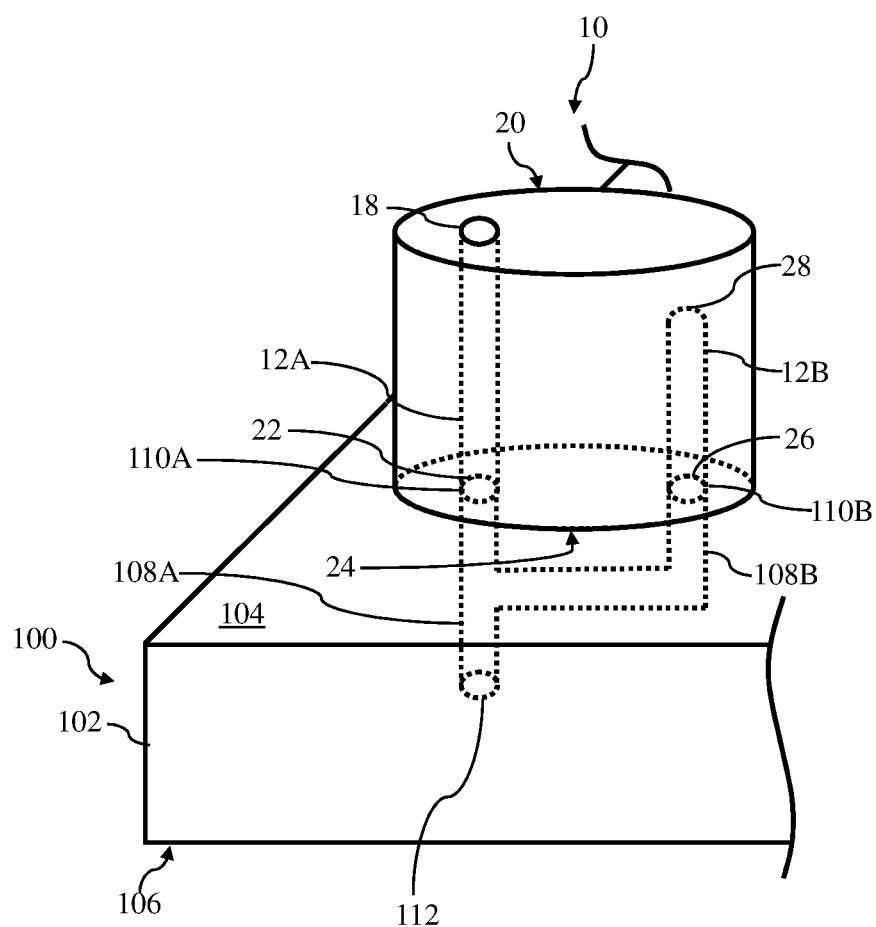
FIG. 13 shows a perspective view of the build plate of FIG. 1 and a component built on the build plate, according to more embodiments.

FIGS. 12 and 13 show non-limiting examples of build plate 100 including a single inlet opening 112 formed in bottom surface 106 of build plate 100. In the non-limiting example, build plate 100 may still include two distinct conduits 108A, 108B and two distinct outlet openings 110A, 110B formed on and/or through build surface 104. As discussed herein, the number of conduits 108A, 108B and/or number of outlet openings 110A, 110B may be dependent, at least in part, on the number of channels 12A, 12B and/or geometry of channels 12A, 12B of component 10. However, in the non-limiting example, the number of inlet openings (e.g., single inlet opening 112) may not be dependent on the number of conduits 108A, 108B, the number of outlet openings 110A, 110B, the number of channels 12A, 12B, and/or the geometry of channels 12A, 12B of component 10.

Figure 14:
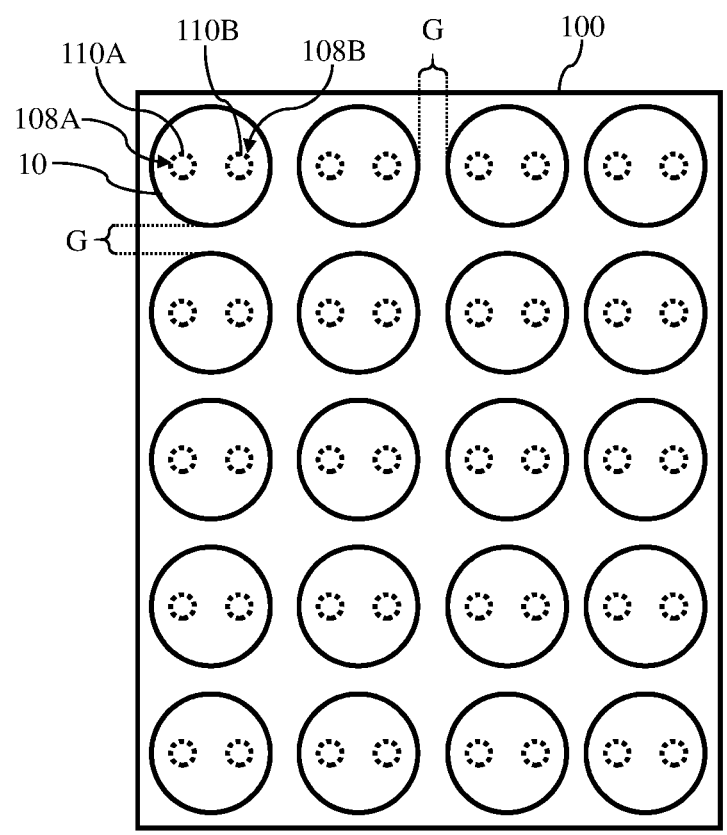
FIG. 14 shows a top view of the build plate of FIG. 1 and a plurality of components, according to embodiments.

In the non-limiting examples shown in FIGS. 13 and 14, inlet opening 112 may be fluidly coupled to and/or in fluid communication with first conduit 108A and second conduit 108B. Additionally, inlet opening 112 may be fluidly coupled to and/or in fluid communication with first outlet opening 110A and second outlet opening 110B via first conduit 108A and second conduit 108B, respectively. In the non-limiting examples, it may also be understood that first conduit 108A and second conduit 108B of build plate 100 may be fluidly coupled and/or in fluid communication with one another. In the non-limiting example shown in FIG. 12, single inlet opening 112 may be formed through bottom surface 106 of build plate 100 (centrally) between and/or not in alignment with either one of first outlet opening 110A or second outlet opening 110B. As a result, and as shown in FIG. 12, build plate 100 may include a joint conduit 122 that may be positioned between and/or in direct fluid communication with inlet opening 112, and first conduit 108A and second conduit 108B, respectively.

Distinct from FIG. 12, in the non-limiting example shown in FIG. 13, single inlet opening 112 may be substantially aligned with first outlet opening 110A of build plate 100. As such, first conduit 108A may positioned between, aligned with and/or in direct fluid communication with inlet opening 112 and first outlet opening 110A. Additionally, and as shown in the non-limiting example of FIG. 13, second conduit 108B may branch from and be fluidly coupled to first conduit 108A. In other non-limiting examples, and as a result of including a single inlet opening 112, build plate 100 may include a single conduit, manifold or plenum. When providing fluid through build plate 100 via inlet opening 112 to remove unsintered material and/or particles from channels 12A, 12B of component 10, (joint conduit 122 and/or) first conduit 108A and second conduit 108B may provide the fluid to each outlet opening 110A, 110B of build plate 100 simultaneously.

FIG. 14 shows a top view of build plate 100 of the AMS (see, FIG. 14) including a plurality of components 10 built thereon. Channels 12A, 12B, and other portions of components 10 may be omitted from FIG. 14 for clarity. As shown in FIG. 14, each of the plurality of components 10 may be formed, positioned and/or built directly on build plate 100. Additionally, and as shown in FIG. 14, each of the plurality of components 10 may be positioned directly adjacent one another on build plate 100, and may be separated by a gap (G). The gap (G) separating each of the plurality of components 10 may be a predetermined distance that may be dependent on the size, shape and/or geometry of components 10 being built on build plate 100. As such, the predetermined distance for the gap (G) formed between each component 10 may ensure that component 10 built on build plate 100 may not contact and/or interfere with the building of a distinct component 10 formed build plate 100. Additionally, the predetermined distance for the gap (G) may also maximize the number of components 10 that may be included and/or built directly on build plate 100 of the AMS. In a non-limiting example, the predetermined distance for the gap (G) may be minimal and/or may be within a range of approximately 0.5 millimeters (mm) to approximately 50 mm.

As a result of the predetermined distance for the gap (G) being minimal (e.g., 5 mm to 50 mm), portions of component 10 built on build plate 100 may not be accessible. For example, portions of side surface 30 of component 10 including aperture 32 (see, FIG. 8) may not be accessible to a user who may perform processes for providing fluid through channels 12A, 12B (see, FIG. 3) to remove unsintered material and/or particles. As such, the fluid provided to remove unsintered material and/or particles may only be provided to channels 12A, 12B through build plate 100, and specifically, conduits 108A, 108B, outlet openings 110A, 110B and/or inlet openings 112A, 112B, as discussed herein. In the non-limiting example shown in FIG. 14, because conduits 108A, 108B are formed entirely through body 102 of build plate 100, all channels 12A, 12B of component 10 may be accessible and/or capable of receiving fluids.

FIG. 15 shows a schematic/block view of an illustrative computerized additive manufacturing system 900 for generating component 10 on build plate 100 positioned on build platform 120. In this example, system 900 is arranged for direct metal laser melting (DMLM), a metal powder additive manufacturing process. It is understood that the general teachings of the disclosure are equally applicable to other forms of additive manufacturing. AM system 900 generally includes a computerized additive manufacturing (AM) control system 904 and an AM printer 906. AM system 900, as will be described, executes code 920 that includes a set of computer-executable instructions defining component 10 to physically generate component 10 on build plate 100 using AM printer 906. Each AM process may use different raw materials in the form of, for example, fine-grain metal powder, a stock of which may be held in a chamber 910 of AM printer 906. In the instant case, component 10 may be made of metal or a metal alloy. As illustrated, an applicator 912 may create a thin layer of raw material 914 spread out as the blank canvas from which each successive slice of the final component 10 will be created. In the example shown, a laser or electron beam 916, positioned above build platform 120, and/or build plate 100, fuses particles for each slice, as defined by code 920. Although one laser or electron beam 916 is shown, it is understood that AM system 900 may include more. Various parts of AM printer 906 may move to accommodate the addition of each new layer, e.g., a build platform 120 may lower and/or chamber 910 and/or applicator 912 may rise after each layer. In this example, build plate 100 is distinct from and/or positioned on or above build platform 120. It is understood that build plate 100 is not limited to the example of FIG. 1, and build platform 120 may in one example act as build plate 100 for building component 10 thereon.

AM control system 904 is shown implemented on computer 930 as computer program code. To this extent, computer 930 is shown including a memory 932, a processor 934, an input/output (I/O) interface 936, and a bus 938. Further, computer 930 is shown in communication with an external I/O device/resource 940 and a storage system 942. In general, processor 934 executes computer program code, such as AM control system 904 that may be stored in memory 932 and/or storage system 942 under instructions from code 920 representative of support 100 and/or component 10. While executing computer program code, processor 934 can read and/or write data to/from memory 932, storage system 942, I/O device 940 and/or AM printer 906. Bus 938 provides a communication link between each of the components in computer 930, and I/O device 940 can comprise any device that enables a user to interact with computer 940 (e.g., keyboard, pointing device, display, etc.). Computer 930 is only representative of various possible combinations of hardware and software. For example, processor 934 may comprise a single processing unit, or be distributed across one or more processing units in one or more locations, e.g., on a client and server. Similarly, memory 932 and/or storage system 942 may reside at one or more physical locations. Memory 932 and/or storage system 942 can comprise any combination of various types of non-transitory computer readable storage medium including magnetic media, optical media, random access memory (RAM), read only memory (ROM), etc. Computer 930 can comprise any type of computing device such as a network server, a desktop computer, a laptop, a handheld device, a mobile phone, a pager, a personal data assistant, etc.

Additive manufacturing processes begin with a non-transitory computer readable storage medium (e.g., memory 932, storage system 942, etc.) storing code 920 representative of component 10. As noted, code 920 includes a set of computer-executable instructions defining component 10 that can be used to physically generate component 10, upon execution of the code by system 900. For example, code 920 may include a precisely defined 3D model of component 10 and can be generated from any of a large variety of well-known computer aided design (CAD) software systems such as AutoCAD®, TurboCAD®, DesignCAD 3D Max, etc. In this regard, code 920 can take any now known or later developed file format. For example, code 920 may be in the Standard Tessellation Language (STL) which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional component to be fabricated on any AM printer. Code 920 may be translated between different formats, converted into a set of data signals and transmitted, received as a set of data signals and converted to code, stored, etc., as necessary. Code 920 may be an input to system 900 and may come from a part designer, an intellectual property (IP) provider, a design company, the operator or owner of system 900, or from other sources. In any event, AM control system 904 executes code 920, dividing component 10 into a series of thin slices that it assembles using AM printer 906 in successive layers of powder. In the DMLM example, each layer may be melted or sintered to the exact geometry defined by code 920 and fused to the preceding layer. Subsequently, component 10 and/or build plate 100 may be exposed to any variety of finishing processes, e.g., minor machining, sealing, polishing, assembly to another part, etc.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A build plate of an additive manufacturing system, the build plate comprising:
  a body including:
   a build surface enabling the additive manufacturing system to build a plurality of components thereon during an additive manufacturing process; and
   a bottom surface opposite and joined to the build surface, the bottom surface sized to position on an adjustable build platform;
   a plurality of conduits through the body and extending between the build surface and the bottom surface, each of the plurality of conduits are capable of enabling fluid flow through the body of the build plate for removing unsintered material during the additive manufacturing process,
  each of the plurality of conduits including:
   a first portion extending from and substantially perpendicular to the bottom surface;
   a second portion substantially perpendicular to the first portion, the second portion having a first end and a second end, wherein the first portion is in fluid communication with the second portion at a midpoint between the first and second ends;
   a third portion extending from the first end of the second portion to the build surface, the third portion substantially perpendicular to and in fluid communication with the second portion;
   a fourth portion extending from the second end of the second portion to the build surface, the fourth portion substantially perpendicular to and in fluid communication with the second portion,
   a first outlet opening adjacent a second outlet opening, wherein the first outlet opening and the second outlet opening are on the build surface of the body, the first outlet opening fluidly coupled to the third portion, and wherein the second outlet opening is fluidly coupled to the fourth portion; and an inlet opening on the bottom surface of the body, the inlet opening fluidly coupled to the first portion.

2. A build plate of an additive manufacturing system, the build plate comprising:
- a body including:
  - a build surface enabling the additive manufacturing system to build a plurality of components thereon during an additive manufacturing process; and
  - a bottom surface opposite and joined to the build surface, the bottom surface sized to position on an adjustable build platform;
- a plurality of conduits through the body and extending between the build surface and the bottom surface, each of the plurality of conduits are capable of enabling fluid flow through the body of the build plate for removing unsintered material during the additive manufacturing process,
- each of the plurality of conduits including:
- a first portion extending between the bottom surface and the top surface of the build plate, the first portion being substantially perpendicular to the bottom surface,
- a second portion substantially perpendicular to the first portion, the second portion having a first end and a second end, wherein the first end of the second portion is in fluid communication with the first portion at a midpoint between top surface and bottom surface of the build plate;
- a third portion extending from the second end of the second portion to the build surface, the third portion substantially perpendicular to and in fluid communication with the second portion;
- a first outlet opening adjacent a second outlet opening, wherein the first outlet opening and the second outlet opening are on the build surface of the body, the first outlet opening fluidly coupled to the first portion, and wherein the second outlet opening is fluidly coupled to the third portion; and
- an inlet opening on the bottom surface of the body, the inlet opening fluidly coupled to the first portion.

* * * * *